Patented Nov. 4, 1952

2,616,896

UNITED STATES PATENT OFFICE 2,616,896

SYNTHESIS OF TRYPTAMINE

David I. Weisblat and Douglas A. Lyttle, Kalamazoo, Mich., assignors to The Upjohn Company, Kalamazoo, Mich., a corporation of Michigan No Drawing. Application March 24, 1949,
Serial No. 83,282

6 Claims. (Cl. 260—319)

This invention relates to the preparation of beta-(3-indole)-alkyl amines and is more particularly concerned with a method and intermediates useful in the synthesis of tryptamine.

Tryptamine, beta-(3-indole)-ethyl amine, has the formula

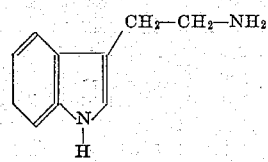

It has long been recognized as an important constituent of many biologically active natural compounds being an integral part of the molecule of the bufotenins, the harmala alkaloids, strychnine and of other naturally occurring compounds. It is also a metabolic product of the decarboxylation of the amino acid tryptophane.

It is an object of the present invention to provide a new and useful method for the synthesis of tryptamine. Another object of the invention is to provide a novel method for the production of tryptamine from an ester of alpha-nitro-beta-(3-indole)propionic acid. A further object of the invention is to provide a process for the preparation of tryptamine which includes the step of reducing beta-(3-indole)nitroethane. An additional object of the invention is to provide a novel intermediate, beta-(3-indole)nitroethane, useful in the preparation of tryptamine. Other objects of the invention will be apparent from the following specification and claims.

The method of the present invention comprises the conversion of an ester of alpha-nitro-beta-(3-indole)propionic acid (I) to beta-(3-indole)-nitroethane (III) and the reduction of the latter compound to tryptamine (IV) according to the following equations:

In the formulae given, R represents any hydrocarbon radical or any substituted hydrocarbon radical wherein the substituent is non-reactive under the reaction conditions. Esters of alpha-nitro-beta-(3-indole)propionic acid (I) which can be used in the process include the methyl, ethyl, n-propyl, iso-propyl, hexyl, tert-butyl, nonyl, decyl, phenyl, p-tolyl, o-tolyl, m-tolyl, o-xenyl, naphthyl, benzyl, p-methylbenzyl, cyclohexyl, methylcyclohexyl, phenylcyclohexyl, beta-chloroethyl, beta-hydroxyethyl, beta-bromoethyl, chlorophenyl, nitrophenyl, bromocyclohexyl and many other esters. The process of the invention will, for the sake of convenience, be described with particular reference to the use of ethyl alpha-nitro-beta-(3-indole)propionate.

The hydrolysis of an ester of alpha-nitro-beta-(3-indole)propionic acid (I) can be accomplished by means of an alkaline hydrolytic agent, such as aqueous alcoholic sodium hydroxide at room temperature, or by means of an acidic hydrolytic agent, such as aqueous alcoholic hydrogen chloride. In the case of alkaline hydrolysis, a salt of alpha-nitro-beta-(3-indole)propionic acid (II) is first formed which is stable in solution but which upon acidification of the solution, loses carbon dioxide even at room temperature with the formation of crystalline beta-(3-indole)nitroethane (III). The latter can be recovered by filtering. When the hydrolysis is carried out in an acid medium, beta-(3-indole)nitroethane (III) is obtained directly.

The alkali metal salts of alpha-nitro-beta-(3-indole)propionic acid are soluble in water but only slightly soluble in alcohol. They can be recovered in good yield from an alkaline hydrolysis mixture by adding ethanol sufficient to give a high concentration thereof in the mixture. The mixture can then be filtered and the precipitated salt washed with alcohol and ether and dried. The

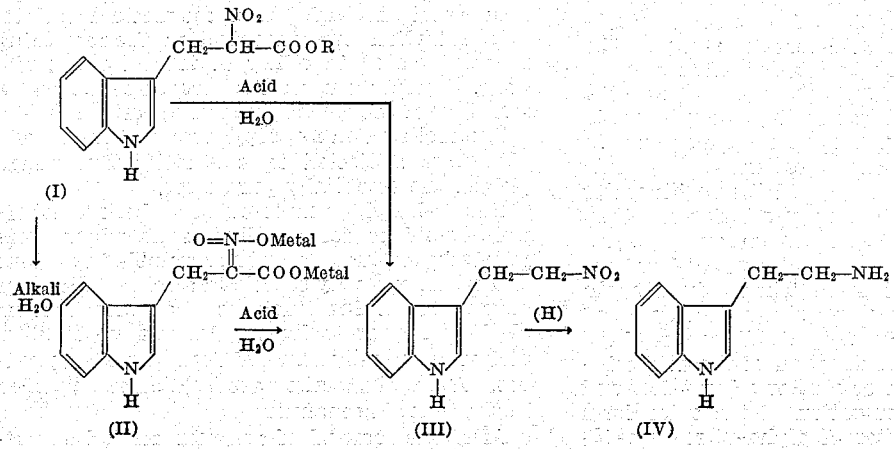

alkali metal salts can be purified by recrystallization from aqueous alcohol. The dry salts are light colored stable compounds. The metal salts of alpha-nitro-beta-(3-indole)propionic acid have not been described previously.

Beta-(3-indole)nitroethane, which is herein described for the first time, is a very pale yellow to colorless crystalline compound substantially insoluble in water and soluble in warm alcohol. It can be purified by recrystallization from aqueous alcohol and when so purified melts at about 69° to 70° C. A polymorphic form has been observed which melts at about 56° to 56.6° C. but which changes to the higher melting form upon standing at room temperature for several weeks.

Beta-(3-indole)nitroethane can be reduced to tryptamine by any one of several methods. For example, beta-(3-indole)nitroethane, a small amount of an organic solvent, such as absolute ethanol or butanol, and a quantity of Raney nickel catalyst can be placed in an autoclave under an initial hydrogen pressure of from about 1000 to about 2000, preferably about 1500, pounds per square inch at about 25° C. and the temperature raised rapidly to above about 70° C., preferably to about 100° C., until substantially the theoretical amount of hydrogen is absorbed. Other hydrogenation catalysts, such as platinum oxide, platinum or palladium can also be employed. The addition of glacial acetic acid or carbon dioxide to the solvent does not improve the yield but the crude product obtained is lighter in color. The reduction can also be carried out in aqueous alcoholic solution using iron, tin or zinc and a mineral acid. Ammonium sulfide and certain other reducing agents can also be employed, if desired. Catalytic reduction is preferred, however, the tryptamine generally being isolated in the form of its salt, the acetate being preferred.

Esters of alpha-nitro-beta-(3-indole)propionic acid useful as starting materials in the method of the present invention can be obtained by methods disclosed and claimed in copending applications Serial No. 733,982, filed March 11, 1947, and Serial No. 777,584, filed October 2, 1947. According to the copending applications, the synthesis of esters of alpha-nitro-beta-(3-indole)-propionic acid can be accomplished by the alkylation of an ester of nitroacetic acid with gramine (3-dimethylaminomethylindole). The process is carried out conveniently by dissolving the reactants in an anhydrous organic liquid medium, such as xylene, and passing a slow stream of nitrogen for several hours at a temperature of about 100° C. through the vigorously agitated mixture. A considerable quantity of dimethylamine is evolved during the reaction period. The hot solution can then be filtered from a small amount of crystalline solid which forms and the xylene removed by concentrating the mixture in vacuo. The residual gum can be dissolved in chloroform, the solution washed with dilute aqueous hydrochloric acid and then with water until neutral. The chloroform solution can then be dried, concentrated in vacuo and distilled under reduced pressure to remove chloroform and excess nitroacetic ester. The residue is again dissolved in chloroform or similar solvent, and extracted with dilute alkali. Acidification of the alkaline extract and extraction of the acid solution with chloroform or similar solvent followed by drying and concentration of the chloroform extract yields the ester of alpha-nitro-beta-(3-indole)propionic acid in substantially pure form as an oil which crystallizes readily. Representative nitroacetic esters which can be employed include the methyl, ethyl, propyl, iso-propyl, butyl, amyl, n-hexyl, octyl, caproyl, stearyl, cyclohexyl and benzyl esters as well as many others.

Alternatively an alpha-nitro-beta-(3-indole)-propionic acid ester can be obtained by first reacting together an ester of nitromalonic acid, e. g. ethyl nitromalonate, and a dialkylaminomethylindole, such as gramine, with or without the employment of alkali and heat, to form a diester of alpha-nitro-alpha-carboxy-beta-(3-indole)propionic acid, which can be recovered from the reaction mixture, e. g. by evaporating the reaction solvent, and subsequently decarboxylating the diester to remove one of the carboxy groups.

Representative nitromalonic esters which can be used in the process include the methyl, ethyl, propyl, isopropyl, butyl, amyl, n-hexyl, octyl, caproyl, stearyl, cyclohexyl, benzyl and many other esters. Salts of monoesters of nitromalonic acid can also be used, if desired.

Decarboxylation of a diester of alpha-nitro-alpha-carboxy-beta-(3-indole)propionic acid can be effected readily by dissolving the substituted nitromalonate in an organic solvent, e. g. in ether, and adding an alkali metal, e. g., sodium, in alcohol in small portions to the solution. A salt usually forms and can subsequently be treated with dilute acid, e. g. with five per cent aqueous hydrochloric acid, to recover the alpha-nitro-beta-(3-indole)propionic ester in substantially pure form. Other methods for decarbalkoxylation employing other alkaline substances can also be used, if desired.

The following examples illustrate several ways in which the principle of the invention can be applied but are not to be construed as limiting.

*Example 1.—Esters of nitroacetic acid*

The following procedure was employed for the preparation of methyl, isopropyl, n-hexyl, and cyclohexyl esters of nitroacetic acid.

One mol of alcohol was introduced slowly into 0.38 mol of concentrated sulfuric acid with cooling. Nitroacetic acid (0.25 mol) was then added at between zero and five degrees centigrade and the mixture stirred until solution was obtained. The solution was then allowed to stand at room temperature for from 20 to 40 hours, at the end of which time it was diluted with ice and ice-water. Water was separated and the organic layer diluted with two volumes of ether, after which the ether solution was washed three times with water and dried over magnesium sulfate. After filtration and concentration, the remaining oil was treated in either of the following two ways, depending upon the structure and water solubility of the alcohol used in the esterification.

The methyl and isopropyl esters of nitroacetic acid were subjected to one distillation which yielded the essentially pure ester.

The n-hexyl, cyclohexyl, and benzyl ethers were found to form sodium salts which were relatively insoluble in water, insoluble in acetone and ether, and very soluble in alcohol. This was advantageous, inasmuch as the corresponding alcohols appear to have a low water-solubility and are not easily removed from the ester product. The sodium salts were isolated and purified in the following manner:

After the removal of as much alcohol as possible by distillation, the crude ester was treated, slowly, with stirring and cooling in an ice bath, with between about 100 and 150 milliliters of 10 per cent aqueous sodium hydroxide solution. The sodium salt which precipitated was filtered and washed twice with about fifteen milliliters of ice-water and then with acetone. The salt was dried, weighed, and treated with two equivalents of hydrochloric acid in about 100 milliliters of water. The reaction was generally found to be slow, and prolonged shaking was usually necessary to completely free the ester. Ether extraction, followed by washing, drying, and concentration of the ether, resulted in the production of a relatively pure ester, as will be apparent from the analysis of benzyl nitroacetate obtained by the above method.

|  | C | H | N |
|---|---|---|---|
| Theory | 55.3 | 4.64 | 7.75 |
| Found | 55.82 | 4.43 | 7.78 |
|  | 55.96 | 4.34 | 7.69 |

In the preparation of the benzyl ester, it was found advantageous to use dry hydrochloric acid gas as a condensing agent, and the procedure employed was as follows:

Benzyl alcohol (127 grams) and 26.3 grams of nitroacetic acid were mixed, and dry HCl gas passed into the mixture with cooling until the solution was saturated at zero degrees centigrade. The solution was allowed to warm to room temperature and was thereafter allowed to stand for two days. Most of the HCl gas, some benzyl chloride, and some alcohol was removed by concentration in vacuo. After dilution with ether, washing with water, drying the ether solution, and concentrating, the ester was treated with sodium hydroxide and worked up as described above.

Properties of some representative esters of nitroacetic acid are as follows:

| Esters | B. P., °C. | mm. Hg | $N_D^{23-26°C.}$ |
|---|---|---|---|
| Methyl | 68.5 | 5.0 | 1.42257 |
| Ethyl | 76 | 5.0 | 1.4210 |
| Isopropyl | 52 | 0.9 | 1.4203 |
| n-Hexyl |  |  | 1.4364 |
| Cyclohexyl |  |  | 1.4640 |
| Benzyl |  |  | 1.5202 |

*Example 2.—Preparation of some esters of alpha-nitro-beta-(3-indole) propionic acid*

The particular nitroacetic acid ester (0.1 mol), gramine (0.1 mol), and 100 milliliters of dry xylene were placed in a three-neck flask of 250 milliliter capacity, which was fitted with a stirrer, nitrogen inlet, thermometer and condenser. As nitrogen was passed through, the contents of the flask were heated to 90–95 degrees centrigrade with efficient stirring. The heating and stirring were continued until evolution of dimethylamine from the reaction ceased, the time required usually being between 3.5 and 5 hours. The xylene was then removed in vacuo, the last traces being removed between about 60–70 degrees centigrade at 0.5 millimeters of mercury pressure.

The crude methyl, ethyl, isopropyl, n-hexyl, cyclo-hexyl, and benzyl esters of alpha-nitro-beta-(3-indole) propionic acid produced in this manner were capable of further purification and identification.

*Example 3.—Alkylation of an ester of nitromalonic acid*

Ethyl nitromalonate (0.1 mol, 20.5 grams) (prepared according to Arndt and Rose, J. Chem. Soc. 1935, 1–10), gramine (0.1 mol, 17.3 grams) and 100 milliliters of dry xylene were placed in a 250 milliliter three-neck flask fitted with a stirrer, nitrogen inlet, thermometer, and reflux condenser which was surmounted by a soda-lime drying tube. The drying tube was connected to a wash bottle containing standard acid to determine the amount of dimethylamine evolved. When the nitromalonate and gramine were mixed, a reaction occurred with the evolution of some heat, probably the formation of a salt. A moderate stream of nitrogen was passed through the mixture which was heated, with stirring, until a vigorous evolution of dimethylamine began at a temperature of about 100 degrees centigrade. The solution was then heated at 110 to 115 degrees centigrade for 5 hours, whereupon the evolution of dimethylamine became negligible. A total of 69.4 per cent of the theoretical amount of dimethylamine was collected. The warm xylene solution was treated with 1 gram of decolorizing charcoal and filtered. The clear red filtrate was cooled to room temperature and extracted twice with 50-milliliter portions of 10 per cent hydrochloric acid. Upon neutralization of the combined hydrochloric acid layers, an insignificant amount of gramine was recovered. The xylene layer was washed once with water and twice with 50-milliliter portions of 10 per cent sodium carbonate. The xylene solution, containing the neutral material, was dried over magnesium sulfate and concentrated in vacuum. The yield of crude product was 30.1 grams, or 90 per cent of theory. The ethyl - alpha - nitro-alpha-carbethoxy-beta-(3-indole)propionate, $N_D^{20}=1.5455$, analyzed for C, H, and N as follows:

|  | C | H | N |
|---|---|---|---|
| Calculated | 57.48 | 5.43 | 8.38 |
| Found | 57.29 | 5.14 | 8.45 |
|  | 57.19 | 5.14 | 8.23 |

*Example 4.—Decarboxylation of an alkyl-nitromalonic acid ester*

Diethyl alpha - nitro - alpha-carbethoxy-beta-(3-indole)propionate (3.34 grams, 0.01 mol) was dissolved in 15 milliliters of ether. To this solution was added in small portions over a period of about 45 minutes 0.23 gram (0.01 mol) of sodium dissolved in 20 milliliters of absolute ethanol. A salt formed almost immediately after the first addition, and the precipitate increased during the first two hours. After standing overnight at room temperature, the precipitate was filtered off and washed with ether. The nearly white salt was treated with an excess of 5 per cent hydrochloric acid, and the free ethyl alpha-nitro-beta-(3-indole)propionate was extracted into ether. The ether solution was washed with water and dried over magnesium sulfate. After concentration in vacuum, the residual oil crystallized spontaneously. A sample, recrystallized once from 95 per cent alcohol, melted at 64.8–66 degrees centigrade (uncorrected). A mixed melting point with authentic ethyl alpha-nitro-beta-(3-indole)propionate melted at 64.0 degrees centigrade to 66 degrees centigrade.

Representative esters of alpha-nitro-beta-(3-indole)propionic acid which may be prepared by "decarbalkoxylation" of the corresponding substituted nitromalonate as indicated in the foregoing, and physical constants thereof, are as follows:

[Isopropyl alpha-nitro-beta-(3-indole)propionate]

| | | C | H | N |
|---|---|---|---|---|
| $N_D^{45}$=1.541 | Theory | 60.85 | 5.83 | 10.12 |
| | Found | 60.83 | 5.93 | 9.40 |
| | | 61.27 | 6.27 | 9.14 |

[n-Hexyl alpha-nitro-beta-(3-indole)propionate]

| | | C | H | N |
|---|---|---|---|---|
| $N_D$=1.5359 | Theory | 64.13 | 6.97 | 8.80 |
| | Found | 64.02 | 6.96 | 9.11 |
| | | 63.69 | 6.97 | 9.00 |

[Cyclohexyl alpha-nitro-beta-(3-indole)propionate]

| | | C | H | N |
|---|---|---|---|---|
| $N_D$=1.6558 | Theory | 64.54 | 6.37 | 8.86 |
| | Found | 64.45 | 6.49 | 9.38 |
| | | 64.55 | 6.62 | 9.18 |

[Benzyl alpha-nitro-beta-(3-indole)propionate]

| | | C | H | N |
|---|---|---|---|---|
| $N_D^{21}$=1.592 | Theory | 66.65 | 4.97 | 8.64 |
| | Found | 66.48 | 5.07 | 9.02 |
| | | 66.42 | 5.33 | 8.87 |

The latter ester, an oil, crystallized completely upon standing, after which the solid melted at 61.5–62.5 degrees centigrade (uncorr.).

*Example 5.—Preparation of beta-(3-indole)-nitroethane*

A solution consisting of 32.0 grams of sodium hydroxide, 64.0 milliliters of water, 200 milliliters of ethanol and 78.6 grams of ethyl alpha-nitro-beta-(3-indole)propionate was prepared at about 25 degrees centigrade and allowed to stand at room temperature for 48 hours. Alcohol and water were distilled under reduced pressure until the sodium salt of the acid separated as a solid, semi-crystalline mass. Four hundred milliliters of ethanol were added and the insoluble sodium alpha-nitro-beta-(3-indole)propionate recovered by filtering and washing with alcohol and ether. The salt was dissolved in 600 milliliters of water, a small amount of ether which separated was removed and the solution was cooled at 20° C. and acidified to about pH 4.0 with 20 per cent aqueous hydrochloric acid. The acidified solution was cooled at 5° C. for 12 hours and the beta-(3-indole)nitroethane which had crystallized was removed by filtration, washed with water and dried. The crude product was dissolved in 200 milliliters of boiling alcohol and decolorized with charcoal. The solution was filtered, diluted with 95 milliliters of hot water (50°–60° C.) and cooled to 5° C. The crystalline beta-(3-indole)nitroethane which separated was recovered by filtering, washed with 50 per cent alcohol and dried. The beta-(3-indole)nitroethane thus obtained melted at 68.3°–69.2° C.

Analysis calc'd for $C_{10}H_{10}N_2O_2$:
C, 63.14; H, 5.30; N, 14.73
Found:
C, 62.86; H, 5.03; N, 14.71

In some cases a form melting at 55.5°–56.1° C. was obtained. This polymorphic form on standing at room conditions for two months changed into the higher melting form.

In a like manner the isopropyl, methyl, propyl, butyl, amyl, hexyl, octyl, caproyl, steryl, cyclohexyl, benzyl and other esters of alpha-nitro-beta-(3-indole)propionic acid are converted into beta-(3-indole)nitroethane.

Alternatively the hydrolysis and decarboxylation is carried out in one step by warming a solution of 39.3 grams of alpha-nitro-beta-(3-indole)propionic acid ester in a mixture of 100 milliliters of ethanol and 30 milliliters of concentrated aqueous hydrochloric acid at 30°–40° C. for 24 hours, distilling the solvent and purifying as above.

*Example 6.—Reduction of beta-(3-indole)-nitroethane*

There was placed in a suitable hydrogenation bomb, having a capacity of 40 milliliters, 3.8 grams of beta-(3-indole)nitroethane, 15.0 milliliters of absolute alcohol, 1.2 grams of glacial acid and about 0.5 gram of Raney nickel catalyst. The bomb was closed, hydrogen added until the pressure was 1580 pounds per square inch and the temperature of the bomb raised to 100° C. as rapidly as possible. The reduction started when the temperature reached about 85° C. and was complete in about twenty minutes. The bomb was cooled, the contents removed and the catalyst filtered from the solution. One milliliter of glacial acetic acid was added and the alcohol distilled under reduced pressure, 4.02 grams of crude crystalline tryptamine acetate remaining. The crude product was crystallized from a mixture of ethyl acetate and ethanol to give pure tryptamine acetate melting at 132.8°–133.8° C.

A solution of the acetate in water was alkalized with ten per cent aqueous sodium hydroxide. Tryptamine separated in crystalline form and after crystallization from ethyl acetate melted at 114.0°–115.0° C.

We claim:

1. The method which includes: simultaneously hydrolyzing and decarboxylating a mono ester of alpha-nitro-beta-(3-indole)propionic acid to form beta-(3-indole)nitroethane.

2. The method which includes: simultaneously hydrolyzing and decarboxylating a mono ester of alpha-nitro-beta-(3-indole)propionic acid to form beta-(3-indole)nitroethane, the reaction being carried out at about room temperature.

3. The method which includes: subjecting a mono ester of alpha-nitro-beta-(3-indole)propionic acid to the action of an acid hydrolytic agent to cause simultaneous hydrolysis and decarboxylation of the ester and the formation of beta-(3-indole)nitroethane.

4. The method of claim 4 wherein the acid hydrolytic agent is an aqueous alcoholic solution of hydrogen chloride.

5. The method which includes: subjecting a mono ester of alpha-nitro-beta-(3-indole)propionic acid to the action of an alkaline hydrolytic agent to form a salt of alpha-nitro-beta-(3-indole)propionic acid; and acidifying the latter in aqueous solution to form beta-(3-indole)nitroethane.

6. The method of claim 6 wherein the alkaline hydrolytic agent is an aqueous alcoholic solution of an alkali metal hydroxide.

DAVID I. WEISBLAT.
DOUGLAS A. LYTTLE.

REFERENCES CITED

The following references are of record in the file of this patent:

Snyder et al.: Jour. Amer. Chem. Soc., vol 69 (1947), pp. 3140–3142.
Snyder et al.: Jour. Amer. Chem. Soc., vol. 66 (1944), pp. 200 to 204.
Snyder et al.: Jour. Amer. Chem. Soc., vol. 66 (1944), pp. 350–351.
Albertson et al.: Jour. Amer. Chem. Soc., vol. 66 (1944), p. 500.